(12) United States Patent
Bäckström et al.

(10) Patent No.: US 9,420,520 B2
(45) Date of Patent: Aug. 16, 2016

(54) METHOD AND APPARATUS FOR PROVIDING ACCESS FOR A LIMITED SET OF MOBILE STATIONS TO A RESTRICTED LOCAL ACCESS POINT

(75) Inventors: Martin Bäckström, Danderyd (SE); Anders Larsson, Stockholm (SE); Thomas Walldeen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1754 days.

(21) Appl. No.: 12/280,287

(22) PCT Filed: May 30, 2006

(86) PCT No.: PCT/SE2006/050167
§ 371 (c)(1),
(2), (4) Date: Aug. 21, 2008

(87) PCT Pub. No.: WO2007/097673
PCT Pub. Date: Aug. 30, 2007

(65) Prior Publication Data
US 2010/0228859 A1 Sep. 9, 2010

Related U.S. Application Data

(60) Provisional application No. 60/774,666, filed on Feb. 21, 2006.

(51) Int. Cl.
*G06F 15/16* (2006.01)
*H04W 48/04* (2009.01)
(Continued)

(52) U.S. Cl.
CPC ........... *H04W 48/04* (2013.01); *H04L 12/1845* (2013.01); *H04W 4/02* (2013.01); *H04W 48/20* (2013.01); *H04W 60/06* (2013.01)

(58) Field of Classification Search
CPC ..... H04W 48/04; H04W 48/20; H04W 60/06; H04W 4/02; H04L 12/1845
See application file for complete search history.

(56) References Cited

U.S. PATENT DOCUMENTS 5,594,782 A * 1/1997 Zicker et al. ................. 455/417
5,734,707 A * 3/1998 El-Wailly ................. 379/167.06
(Continued)

FOREIGN PATENT DOCUMENTS

GB 2315193 A * 1/1998
WO WO9619088 A2 6/1996
(Continued)

*Primary Examiner* — Krista Zele
*Assistant Examiner* — Anthony Fabbri

(57) ABSTRACT

The invention concerns methods, a device and computer program products for simplifying handover back to a restricted local access point from an unrestricted global access point as well as to a device implementing a restricted local access point for provision in a wireless network and a wireless network. In the network a restricted local access point hands over a mobile station to an unrestricted global access point and provides data enabling the restricted local access point to be identified as a candidate access point. A device for simplifying handover back determines that the restricted local access point is a candidate for further handover based on this data and informs the mobile station about the restricted local access point via the unrestricted glob access point. Thereby hand over may be considered also to the restricted local access point in addition to other surrounding access points.

28 Claims, 4 Drawing Sheets

(51) Int. Cl.
  *H04L 12/18*   (2006.01)
  *H04W 4/02*    (2009.01)
  *H04W 48/20*   (2009.01)
  *H04W 60/06*   (2009.01)

(56) References Cited

U.S. PATENT DOCUMENTS

| | | | |
|---|---|---|---|
| 5,938,721 A * | 8/1999 | Dussell et al. | 701/468 |
| 6,002,679 A * | 12/1999 | Liu et al. | 370/335 |
| 6,014,086 A * | 1/2000 | Miyashita | 340/7.6 |
| 6,094,578 A * | 7/2000 | Purcell et al. | 455/426.1 |
| 6,233,315 B1 * | 5/2001 | Reformato et al. | 379/88.01 |
| 6,370,385 B1 * | 4/2002 | Bohm et al. | 455/450 |
| 6,430,602 B1 * | 8/2002 | Kay et al. | 709/206 |
| 6,446,004 B1 * | 9/2002 | Cao et al. | 701/482 |
| 6,477,150 B1 * | 11/2002 | Maggenti et al. | 370/312 |
| 6,484,033 B2 * | 11/2002 | Murray | 455/456.3 |
| 6,650,902 B1 * | 11/2003 | Richton | 455/456.3 |
| 6,678,613 B2 * | 1/2004 | Andrews et al. | 701/468 |
| 6,778,832 B1 * | 8/2004 | Chow et al. | 455/444 |
| 6,798,755 B2 * | 9/2004 | Lillie et al. | 370/312 |
| 6,904,026 B1 * | 6/2005 | Tarnanen et al. | 370/329 |
| 6,912,389 B2 * | 6/2005 | Bright et al. | 455/433 |
| 7,043,226 B2 * | 5/2006 | Yamauchi | 455/405 |
| 7,046,989 B2 * | 5/2006 | Karaoguz et al. | 455/408 |
| 7,136,645 B2 * | 11/2006 | Hanson et al. | 455/435.1 |
| 7,155,248 B2 * | 12/2006 | Idnani | 455/519 |
| 7,204,746 B2 * | 4/2007 | Purkayastha et al. | 455/552.1 |
| 7,386,296 B2 * | 6/2008 | Karaoguz et al. | 455/408 |
| 7,420,964 B2 * | 9/2008 | Narvanen et al. | 370/353 |
| 8,019,335 B2 * | 9/2011 | Kallio | 455/426.1 |
| 2002/0075305 A1 * | 6/2002 | Beaton et al. | 345/751 |
| 2002/0077136 A1 * | 6/2002 | Maggenti et al. | 455/518 |
| 2002/0111166 A1 * | 8/2002 | Monroe | H04W 48/20 455/435.3 |
| 2002/0119788 A1 * | 8/2002 | Parupudi et al. | 455/456 |
| 2002/0150091 A1 * | 10/2002 | Lopponen et al. | 370/389 |
| 2003/0125876 A1 * | 7/2003 | Root et al. | 702/3 |
| 2003/0224762 A1 * | 12/2003 | Lau et al. | 455/412.2 |
| 2003/0225589 A1 * | 12/2003 | Eaton et al. | 705/1 |
| 2004/0110530 A1 * | 6/2004 | Alone | H04L 63/10 455/552.1 |
| 2004/0229614 A1 * | 11/2004 | Kim et al. | 455/435.1 |
| 2005/0018633 A1 * | 1/2005 | Shirota et al. | 370/331 |
| 2005/0025109 A1 * | 2/2005 | Ratasuk et al. | 370/342 |
| 2005/0054361 A1 * | 3/2005 | Turcanu et al. | 455/518 |
| 2005/0208935 A1 * | 9/2005 | Mountney et al. | 455/422.1 |
| 2005/0208954 A1 * | 9/2005 | Boss et al. | 455/456.1 |
| 2005/0227666 A1 * | 10/2005 | Cheng | H04W 76/007 455/404.1 |
| 2006/0014498 A1 * | 1/2006 | Yau et al. | 455/90.2 |
| 2006/0039304 A1 * | 2/2006 | Singer et al. | 370/310 |
| 2006/0229093 A1 * | 10/2006 | Bhutiani et al. | 455/518 |
| 2006/0252408 A1 * | 11/2006 | Faccin et al. | 455/404.2 |
| 2006/0265737 A1 * | 11/2006 | Morris | H04L 63/0823 726/3 |
| 2006/0270361 A1 * | 11/2006 | Szymanski et al. | 455/90.2 |
| 2007/0036118 A1 * | 2/2007 | Shaffer et al. | 370/338 |
| 2007/0037596 A1 * | 2/2007 | Shaffer et al. | 455/518 |
| 2007/0063834 A1 * | 3/2007 | Bozzone et al. | 340/539.1 |
| 2007/0082681 A1 * | 4/2007 | Kim | H04W 8/10 455/456.1 |
| 2007/0104121 A1 * | 5/2007 | Shaffer et al. | 370/276 |
| 2007/0105578 A1 * | 5/2007 | Shaffer et al. | 455/518 |
| 2007/0133435 A1 * | 6/2007 | Eneroth et al. | 370/260 |
| 2007/0192428 A1 * | 8/2007 | Goldfarb et al. | 709/207 |
| 2007/0220169 A1 * | 9/2007 | Silver et al. | 709/246 |
| 2008/0005275 A1 * | 1/2008 | Overton et al. | 709/218 |
| 2008/0064422 A1 * | 3/2008 | Scholl | 455/466 |
| 2008/0102869 A1 * | 5/2008 | Shaffer et al. | 455/518 |
| 2010/0056173 A1 * | 3/2010 | Bloom | H04W 4/02 455/456.1 |
| 2010/0062752 A1 * | 3/2010 | Shim | G01S 5/0205 455/418 |

FOREIGN PATENT DOCUMENTS

| | | |
|---|---|---|
| WO | WO 99/14974 | 3/1999 |
| WO | WO 2004/004278 A1 | 1/2004 |
| WO | WO 2004/013986 A1 | 2/2004 |

* cited by examiner

METHOD AND APPARATUS FOR PROVIDING ACCESS FOR A LIMITED SET OF MOBILE STATIONS TO A RESTRICTED LOCAL ACCESS POINT

This application is a 371 of PCT/SE2006/050167, filed May 30, 2006, which claims the benefit of U.S. Provisional Application No. 60/774,666, filed Feb. 21, 2006, the disclosures of which are fully incorporated herein by reference.

TECHNICAL FIELD OF THE INVENTION

The present invention relates to the field of telecommunication. The invention more particularly relates to a method and computer program product for providing access for a limited set of mobile stations to a restricted local access point in a wireless network, a control device for a restricted local access point for provision in a wireless network, a device implementing a restricted local access point for provision in a wireless network and a wireless network.

DESCRIPTION OF RELATED ART

There has for some time been of interest to allow the use of one and the same mobile station at home and in a public wireless network.

For this reason there has been provided stations that have a dual mode operation, one cellular mode and one cordless mode. The mobile station then switches between modes as it moves between a public cellular network and a cordless base station. This is advantageous if a mobile station is to be provided in two different networks.

However these stations require exchange of the existing legacy cellular phone owned by the end user and are furthermore costly for the end user because of the dual mode operation.

It would therefore be of interest to allow a mobile station to be used both at home and in a cellular network and without the user having to acquire a special dual mode mobile station, i.e. through the user using an ordinary mobile station adapted for use in the public cellular network and to use it in his home with a home base station. This also opens the market of public wireless network operators to the home telephony segment.

The present invention is directed towards providing a mobile station end user with this ability using his ordinary mobile station.

SUMMARY OF THE INVENTION

One object of the present invention is thus directed towards providing a method of providing access for a limited set of mobile stations to a restricted local access point in a wireless network that allows the use of one and the same mobile station for the restricted local access point and the main part of the network.

This object is according to a first aspect of the present invention achieved through a method of providing access for a limited registered set of mobile stations to a restricted local access point in a wireless network, comprising the steps of:
  attracting mobile stations in an area covered by a restricted local access point,
  for each mobile station that is attracted,
    determining if the station belongs to the set,
    allowing access to the access point in case it does, and
    rejecting access to the access point in case it does not.

Another object of the present invention is directed towards providing a control device for a restricted local access point for provision in a wireless network that allows the use of one and the same mobile station for the restricted local access point and the main part of the network.

This object is according to a second aspect of the present invention achieved through a control device for a restricted local access point for provision in a wireless network, said restricted local access point being implemented by a device comprising a radio communication unit,
  said control device being arranged to
    order the radio communication unit to attract mobile stations in an area covered by the restricted local access point,
    for each mobile station that is attracted,
      determine if the station belongs to a limited registered set of mobile stations,
      allow access to the access point in case it does, and
      reject access to the access point in case it does not.

Another object of the present invention is directed towards providing a device implementing a restricted local access point for provision in a wireless network that allows the use of one and the same mobile station for the restricted local access point and the main part of the network.

This object is according to a third aspect of the present invention also achieved through a device implementing a restricted local access point for provision in a wireless network comprising
  a radio communication unit, and
  a control device for the restricted local access point being arranged to
    order the radio communication unit to attract mobile stations in an area covered by the restricted local access point,
    for each mobile station that is attracted,
      determine if the station belongs to a limited registered set of mobile stations,
      allow access to the access point in case it does, and
      reject access to the access point in case it does not.

Still another object of the present invention is directed towards providing a wireless network that allows the use of one and the same mobile station for a restricted local access point in the network and the main part of the network.

This object is according to a fourth aspect of the present invention also achieved through a wireless network comprising:
  a number of unrestricted global access points,
  at least one device implementing a restricted local access point that comprises a radio communication unit, and
  a control device for the restricted local access point being arranged to
    order the radio communication unit to attract mobile stations in an area covered by the restricted local access point,
    for each mobile station that is attracted,
      determine if the station belongs to a limited registered set of mobile stations,
      allow access to the access point in case it does, and
      reject access to the access point in case it does not.

Yet another object of the present invention is directed towards providing a computer program product that allows the use of one and the same mobile station for a restricted local access point in a wireless network and in a main part of the network.

This object is according to a fifth aspect of the present invention achieved through a computer program product for providing access for a limited registered set of mobile stations to a restricted local access point in a wireless network, comprising computer program code to make a control device for the restricted local access point perform, when the code is loaded into said device:

order a radio communication unit of the restricted local access point to attract mobile stations in an area covered by the restricted local access point, for each mobile station that is attracted.

determine if the station belongs to a limited registered set of mobile stations, allow access to the access point in case it does, and reject access to the access point in case it does not.

An unrestricted global access point is here defined as an access point which when provided in a network allows all mobile stations in the network to essentially communicate on equal terms, while a restricted local access point is here defined as an access point that has a separate set of rules relating to a limited set of mobile stations within the network and is mainly intended to allow these stations to communicate with a specific restricted local access point. Alternatively a restricted local access point can be restricted only in the sense of having lower output power, thus creating a range of coverage restricted to its close vicinity.

The present invention has many advantages. It allows an ordinary mobile station to be used both for a restricted local access point and in the main part of the network. Another advantage is that only the mobile stations registered to a restricted local access point may use it. This avoids that mobile stations nearby occupy the access point, while the calls of registered mobile stations are ensured to pass through the restricted local access point.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
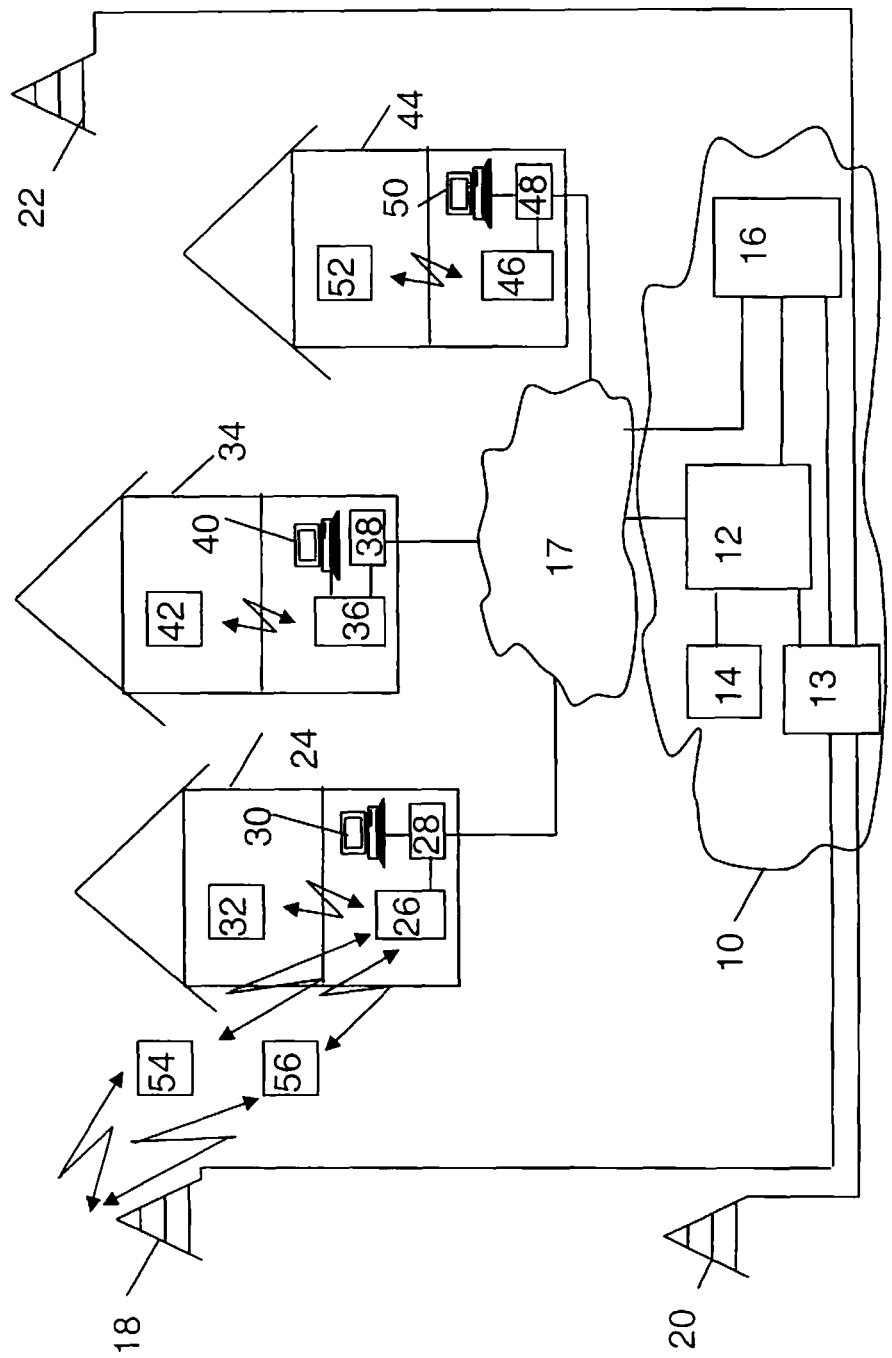
FIG. 1 schematically shows a wireless network comprising three ordinary unrestricted global access points and three restricted local access points, where each restricted local access point is being provided in a house, as well as a number of related entities of the network.

The present invention is described in the non-limiting, context of a wireless network in the form of a Public Land Mobile Network that is here a GSM (Global System for Mobile communications) network 10 shown in FIG. 1. Here it should be realised that the network is in no way limited to GSM, but can be any type of public land mobile network, like GPRS (General Packet Radio Service), UMTS (Universal Mobile Telecommunications System). It can also be based on for instance WLAN (Wireless Local Area Network) technology. The network 10 here includes at least one first traffic control unit 12, which in the case of GSM is an MSC (Mobile Services Switching Centre). If the network was a GPRS network this unit would be a SGSN (Serving GPRS Support Node) instead. To the first traffic control unit 12, there is connected a VLR 14 (Visiting Location Register), which will be described in more detail later in relation to a second embodiment of the present invention. The first traffic control unit 12 is furthermore connected to a first, second and third unrestricted global access point 18, 20 and 22 in the form of base stations via a second traffic control unit 13 in the form of a BSC (Base Station Controller). It is possible to combine GPRS and GSM networks. In this case the second traffic control unit 13 would be connected to both an MSC and a SGSN. The base stations 18, 20, 22 are ordinary base stations, which any mobile station being allowed to communicate in the network 10 can use for communication. In FIG. 1 two such ordinary mobile stations 54 and 56 are shown as communicating with a first base station 18. The network 10 also includes an Operation and Maintenance service centre 16, where customer service is handled. This service centre 16 is also connected to the both the traffic control units 12 and 13. It may also be connected to unrestricted global access points (not shown). The service centre 16 and the first traffic control unit 12 are furthermore both connected to an external communication network 17, which is here the Internet. It should be realised that the first traffic control unit 12 may be connected to several second traffic control units 13, and that there may be several more first traffic control units 12 in the wireless network 10 in order to control communication with mobile stations via one or more access points. It should also be realised that the network need not be provided with a central traffic control unit at all. What has been described so far is well known within the art.

In FIG. 1 there are also shown three different buildings 24, 34 and 44, where a first building 24 includes a first restricted local access point 26 connected to a modem 28. The modem 28 is connected to the external network 17 as well as a to a computer 30 also provided in the first building. There is also provided a first user mobile station 32 communicating with the first restricted local access point 26. The first user mobile station 32 belongs to a limited set of mobile stations associated with the first restricted local access point 26. The second building 34 includes a second restricted local access point 36 connected to a modem 38, which in turn is connected to the external network 17. Here a computer 40 is connected to the second restricted local access point 36 for connection to the modem 38. The reason for this is that this modem is of a type which only allows one other device to be connected to it. In this second building 34 there is a second user mobile station 42 that belongs to a limited set of mobile stations associated with the second restricted local access point 36. Finally the third building 44 includes a third restricted local access point 46 connected to a modem 48. The modem 48 is connected to the external network 17, as well as to a computer 50 also provided in the third building 44. There is finally provided a third user mobile station 52 communicating with the third restricted local access point 46, where this third user mobile station 52 belongs to a limited set of mobile stations associated with the third restricted local access point 46.

It should here be realised that the restricted access points 26, 36 and 46 for the first, second and third user mobile stations 32, 42, 52 act as access points within the network 10 and are controlled by the first and second traffic control units 12 and 13. The external network 17 is in this case just a channel that is used for providing this communication between the network 10 and the restricted local access points. The external network may also provide other types of communication with for instance the service centre 16. The reason for using the Internet is that many households have easy access to it. For this reason it is also evident that the external network can be any network that is provided for a household and can for instance be a cable TV network instead. In case the household has direct access to a LAN network, a modem might also not be needed. There are thus several ways in which this channel may be provided.

Figure 2:
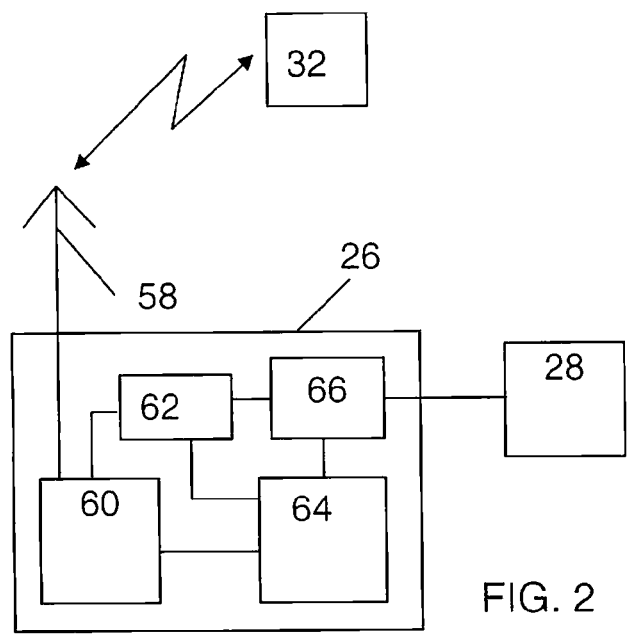
FIG. 2 shows a block schematic of different units of a restricted local access point, FIG. 3 schematically outlines different location areas of the wireless network according to a first embodiment of the present invention

FIG. 2 shows a block schematic of some relevant units of a device implementing the first restricted local access point 26 and the different other devices it communicates with in the first building. It should be realised that the other restricted local access points may be provided in the same way. This device 26 comprises an antenna 58 communicating with the first user mobile station 32, which antenna is connected to a radio circuit 60, which may be provided in the form of an ordinary mobile station chipset. The radio circuit 60 is connected to a control unit 62 and to a signal conversion unit 64 converting circuit switched voice to packet based voice. The signal conversion unit may use UMA/GAN (Unlicensed Mobile Access/Generic Access Network), which is a standard for making GSM calls over 802.11 or Bluetooth, where GSM protocols are tunneled over unlicensed bands. Both the control unit 62 and the signal conversion unit 64 are connected to an interface 66 that in turn is connected to the modem 28.

The purpose of providing a restricted local access point in this way, is to let the operator of the network 10 simulate a home base station within his own network, where an end user can use his ordinary cellular phone also via this restricted local access point. At the same time the user is automatically allowed to use the mobile station in the rest of the public wireless network 10 whenever there is no or insufficient contact with the restricted local access point. In this way it is for instance possible to delete a fixed land line network connection for an end user. The operator may then also provide different billing strategies for calls made via a restricted local access point and via other access points in the network. For the user of the mobile station, the mobile station is thus to resemble a cordless phone when inside the building and an ordinary mobile station when being provided outside the building. There is furthermore no need for the end user to keep track of several different phone numbers. However the restricted local access point is controlled by the operator of the network.

This is thus the functionality that is desired. However, since a restricted local access point is controlled by the network, there has to be provided measures for allowing a first user mobile station associated with the first restricted local access point to communicate with this access point whenever it is possible and also disallow other mobile stations to communicate with it. That is, if the first user mobile station is to use the first restricted local access point, it should be possible to do so if it is close enough. Also other mobile stations that are not associated with it, should be disallowed to use this access point. In order to provide economy, it is furthermore often desirable that such a restricted local access point be provided at a low cost. This also means that it normally is much smaller, weaker in transmission power and provided with fewer traffic channels as compared with an ordinary unrestricted global access point, which furthermore may cover the restricted local access point as an umbrella. Thus an unrestricted global access point may be much stronger than the restricted local access point in the area the restricted local access point is intended to cover. All in all, there are thus several problems that have to be addressed for realising this functionality when ordinary mobile stations adapted for this type of network are to be used.

Figure 3:
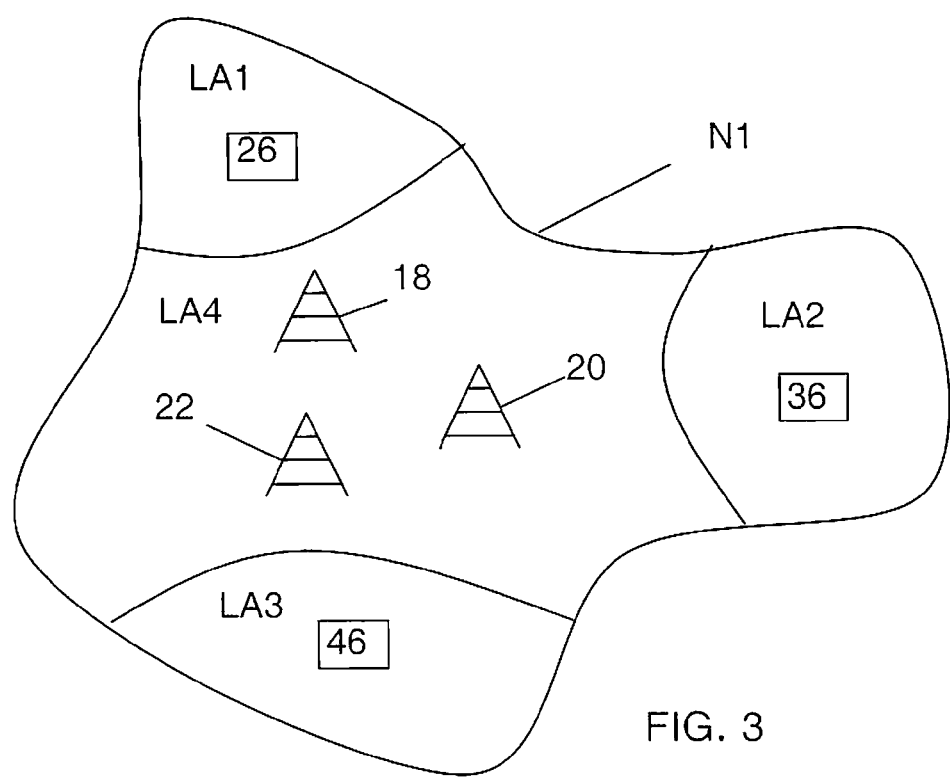

FIG. 3 schematically shows how the different access points of the network of FIG. 1 have been organised according to a first embodiment of the present invention in order to help solving the problems mentioned above. The whole network 10 has a network identity N1 and is divided into sectors in the form of location areas, where a first location area LA1 only includes the first restricted local access point 26, a second location area LA2 only includes the second restricted local access point 36 and a third location area LA3 only includes the third restricted local access point 46. A fourth location area LA4 includes all of the unrestricted global access points 18, 20 and 22. It should here be realised that there may be more location areas including several unrestricted global access points. However according to this embodiment each restricted local access point is associated with one location area. There is thus a one-to-one correspondence between a location area and a restricted local access point. Each restricted local access point is thus associated with a corresponding unique location area.

Figure 4A:
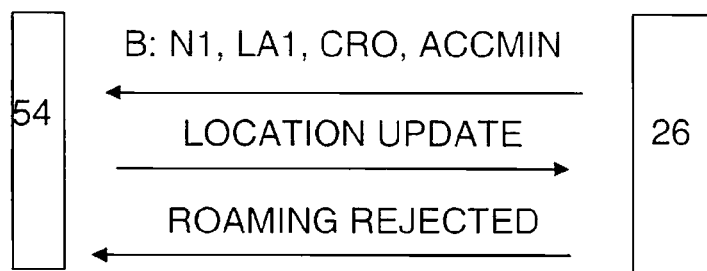
FIGS. 4A and 4B shows different signals exchanged between two different mobile stations and a restricted local access point according to the first embodiment, where one mobile station is allowed access and one is not.
Figure 4B:
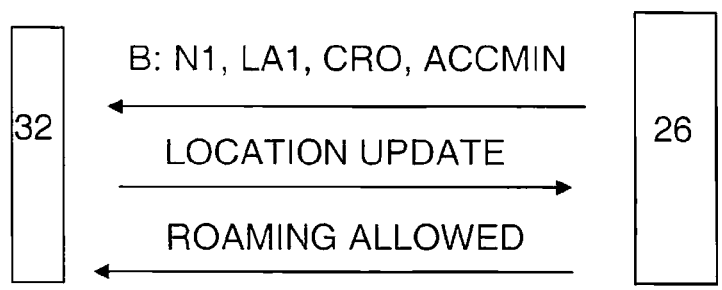
Figure 5:
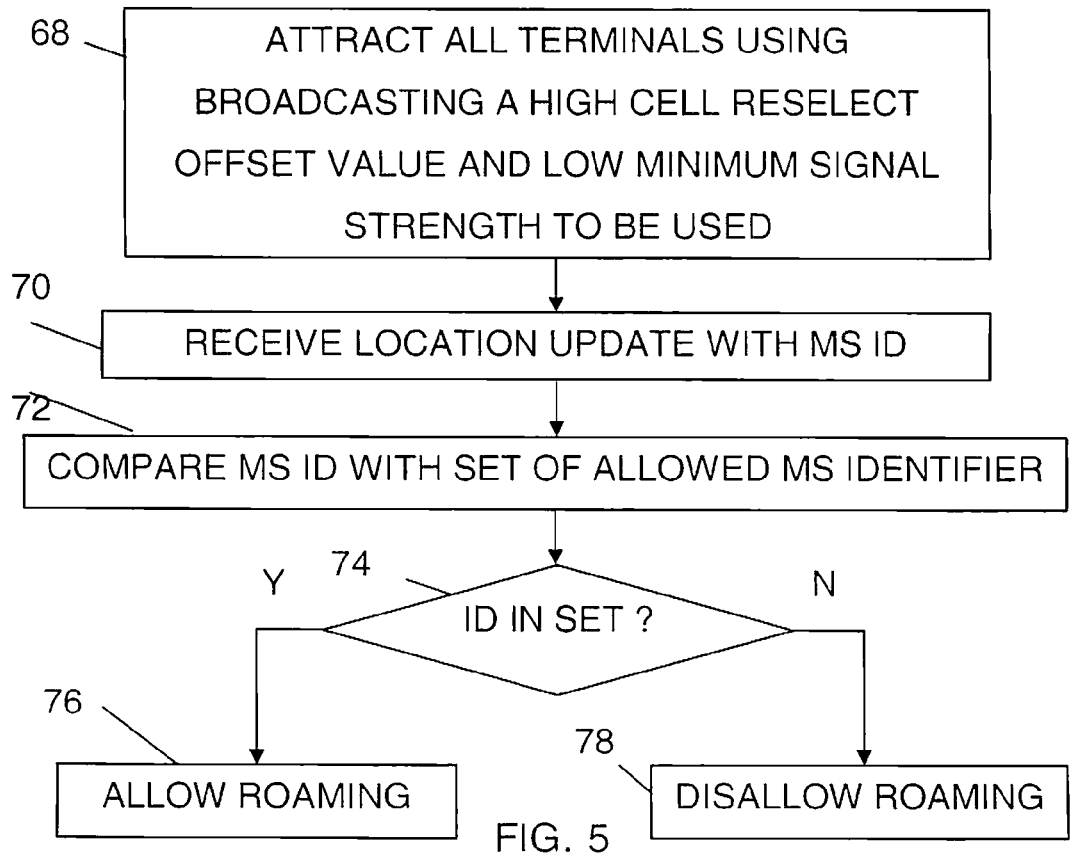
FIG. 5 shows a flow chart of a number of method steps performed in the restricted local access point according to the first embodiment of the present invention, FIG. 6 schematically outlines different network identities used according to a second embodiment of the present invention.

Now the principles of the present invention will be described with reference also being made to FIGS. 4A and 4B, which shows signals transmitted between mobile stations and the first restricted local access point according to the first embodiment and FIG. 5, which shows a flow chart of a method according to the first embodiment of the present invention.

The first restricted local access point 26 works on the principle that it is to attract all mobile stations 32, 54, 56 in the area it covers. It does this by broadcasting information, step 68. The broadcast information then includes the network identity of the network to which it belongs, which is here N1, the location area to which it belongs, which is the location area LA1 as well as a cell reselect offset CRO, and a link quality value, here in the form of a minimum signal strength value ACCMIN. The minimum signals strength value ACCMIN is also known within the field as RXLEV_ACCESSMIN.

As is well known within the art a mobile station constantly monitors the link qualities to different candidate access points in order to determine which access point is preferred. It may do this by comparing link quality values determined for different access points, where a link quality value may be a measured signal strength determined or measured for a candidate access point. It then selects the access point having the best link quality value.

An access point may also indicate a minimum link quality value level for a mobile station to consider the access point in question, which may be a minimum received signal strength value level. This value level sets the minimum level on the link quality value a mobile terminal determines that is to be the base for considering the access point as a candidate.

What a mobile station 32, 54, 56 does, when using link quality in the form of signal strength and when it has received this broadcast information, is that it first investigates if the detected signal strength of the restricted local access point is above the received value ACCMIN. If it is, the mobile station 32, 54, 56 is close enough to the restricted local access point 26. The value may here be set such that a mobile station will detect a higher level than ACCMIN when it is within 20 or 50 meters from the restricted local access point 26. Thereafter the mobile station 32, 54, 56 adds the offset CRO to the same detected signal strength and compares the sum with detected signal strengths of other access points. If now the sum is higher than other detected signal strengths the mobile station 32, 54, 56 is attracted.

When that has been done the mobile station 32, 54, 56 thus decides that the first restricted local access point 26 is a desirable access point to communicate with, i.e. that it should roam into the area covered by that access point. However, since the location area LA1 is different from the location area LA4 of the unrestricted global access points surrounding it, the mobile station 32, 54, 56 will perform a location update and send a location update message, which is received by the restricted local access point. In this location update message, the mobile station provides a mobile station identifier, which is either an IMSI (International Mobile Subscriber Identity) or a TMSI (Temporary Mobile Subscriber Identity). The location update message is received by the radio communication unit 60 of the restricted local access point 26 and forwarded to the control unit 62. In case the identity in the message is an IMSI, the control unit 62 compares this IMSI with a limited registered set of mobile station identifiers associated with the access point, step 72. Here the first user mobile station 32 belongs to this set, while mobile stations 54 and 56 do not. If the identifier is in the set, step 74, the mobile station 32 is allowed to roam into the area covered by the first restricted local access point 26, step 76, whereas if it is not, the roaming of the mobile terminal 54 56 into this area is disallowed, step 78. This response is in GSM a message called "Location Update Rejected" with a cause code "Roaming not allowed in this LA". In any case the control unit 62 orders the radio communication unit 60 to send the response to the mobile station 32, 54, 56. In case a TMSI was received, the control unit 62 would send an Identity Request (IMSI) regarding the TMSI to the first traffic control unit 12, which in turn would locate a corresponding IMSI that it would send to the control unit 62 of the restricted local access point 26 via the second traffic control unit 13. The control unit 62 would then perform the comparing and allow or disallow roaming in the way described above.

The first user mobile station 32 which belongs to a limited set of mobile stations associated with the first restricted local access point, may in this way freely use the first restricted local access point. At the same time other mobile stations not in the set, which may accidentally try to use the first restricted local access point, are not allowed to do so because of the denied roaming. This barring of roaming furthermore stays in place for a long time and the other stations will not try again.

There are some variations that could be provided in relation to this and other embodiments that should be mentioned here. It is also possible to include a timing advance limitation value in the broadcast information. This timing advance limitation value would then limit the timing advance the mobile station would need to perform in order to time itself to the transmission structure (time slots) of the restricted local access point. The timing advance needed is a strong indication that the distance between access point and mobile station is too long for it to be close. The limit should then be a timing advance of zero.

Figure 6:
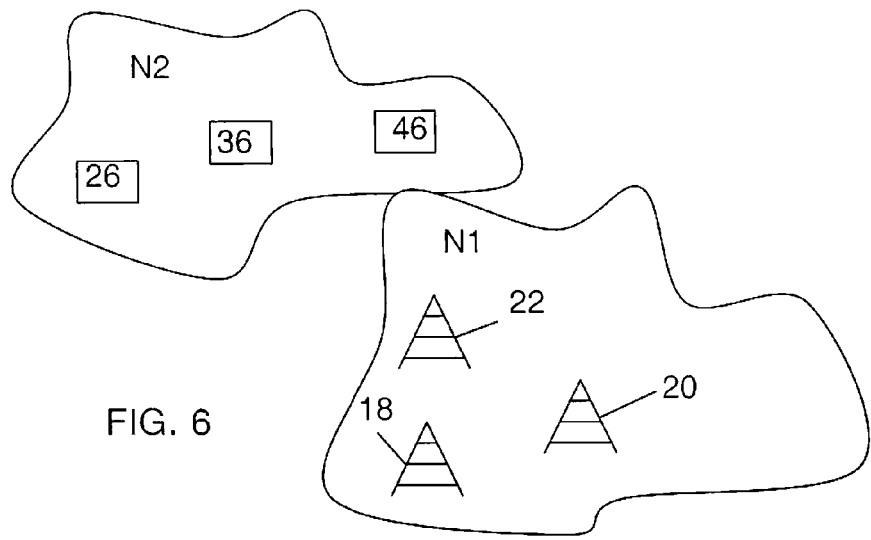
Figure 7A:
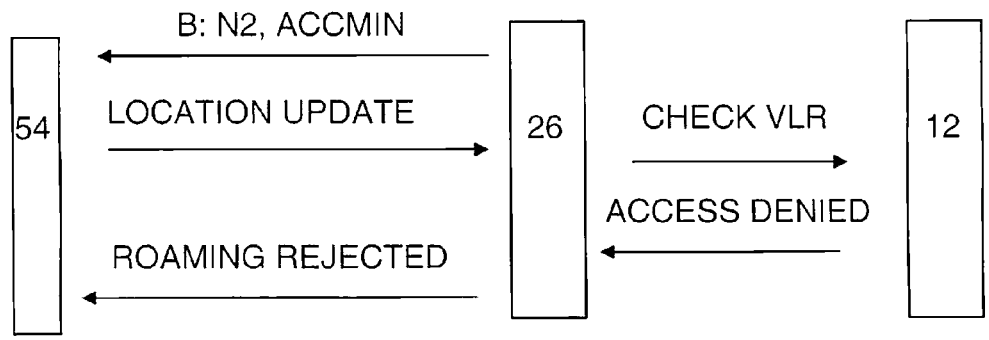
FIGS. 7A and 7B show different signals exchanged between two different mobile stations, the restricted local access point and a traffic control unit in the network according to the second embodiment.
Figure 7B:
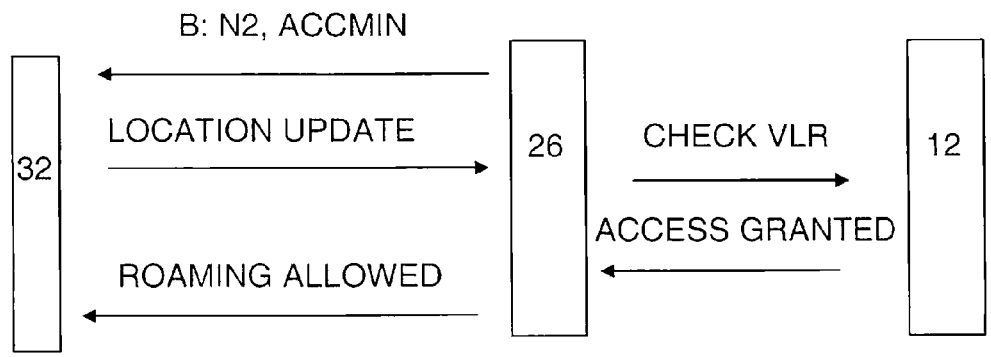

A second way to provide the functionality of the present invention will now be described with reference being made to FIGS. 6 and 7, where FIG. 6 shows how the different access points of the network have been organised according to a second embodiment of the present invention and FIGS. 7A and B show signals transmitted between mobile stations, the first restricted local access point and the first traffic control unit. As is shown in FIG. 6, all the restricted local access points are provided in a part of the network that has a different network identity N2, here a PLMN identity, than the identity of the rest of the network that has a network identity N1, also a PLMN identity. The provision of a second network identity can here also be seen as providing a sector of the network for all restricted local access points. Here the first traffic control unit 12 of the network 10 keeps track of the user mobile stations allowed in the part of the network having the second network identity N2. With this configuration other mobile stations only belong to the part of the network having the first network identity N1, while all user mobile stations are associated with the second network identity N2. This means that all user mobile stations within the set may use any restricted local access point. Here broadcasting is made in the same way mentioned earlier, however using the second network identity N2 instead of the first N1. The local area information and offset value CRO may also be omitted or need not be considered. As a station 32 belongs to a certain network having a certain network identity N2 it always tries to connect to that network. In the case of GSM this means that a SIM—(Subscriber Identity Module) card for the station 32 may have a setting for the network identity N2 as a home network and a setting for the network identity N1 as a preferred visitor network. As before each station 32, 54, 56 that wants to access the network sends a location update message. When the first restricted local access point 26 receives this message it forwards it to the first traffic control unit 12, which goes on an checks in the VLR 14 if the station is allowed to use it. The VLR 14 thus defines an own roaming area. All mobile terminals should then as a default have a roaming restriction to this roaming area. The user mobile terminals of the set should then have this roaming restriction removed in the VLR 14. If a mobile terminal 54, 56 is not allowed to roam, the first traffic control unit 12 therefore sends a roaming rejected signal and if a mobile terminal 32 is allowed to roam, it sends a roaming allowed signal. Here all restricted local access points may be provided in the same location area, which means that all users might be allowed to use all restricted access points. It is of course possible to also here provide location areas that puts restrictions on the use. It is also possible to provide a special zone code if they all have the same location area, where this zone code identifies a sector corresponding to one restricted local access point. This in order to provide multiple sets, where each set is associated with a corresponding restricted local access point.

There are several ways in which mobile stations can be registered for being associated with a set. It is for instance possible to press a button on the device implementing the restricted local access point while the mobile station is switched on nearby. At power on, the mobile station will then perform a so-called IMSI attach, where it provides its identity. The access point will then receive and store the IMSI.

If two mobile stations are switched on at the same time while the button on the device implementing the access point is held down, the procedure will fail with an indication to the end-user to try again.

There are several other different ways in which mobile stations can be registered. It is for instance possible to send MMS or SMS messages from the mobile station to the service centre or to use the computer and log into a web site of the operator or even to call the operator in order to indicate the mobile stations that are to be registered in the set. It is also possible to provide one or more SIM-card slots in the device implementing the restricted local access point, where one twin Sim card is inserted for each person that shall be able to use the restricted local access point and the other twin SIM card is provided in the mobile station.

The identifiers of the registered mobile stations may also be received in a restricted local access point via an ADC (Automatic Device Configuration) that may typically be received by the access point via SMS or using OMA DM (Open Mobile Alliance, Device Management). These are the same types of messages that are normally used to configure a mobile station with settings for various services, such as GPRS settings, WAP, MMS, QoS. The access point can also receive the information via a UMA bearer via the Internet. It is furthermore possible that it is sent from the traffic control unit of the network. In the case of registrations being provided in the VLR, the VLR may receive them from the service centre or from the restricted local access point that received the information.

The control of whether roaming is allowed into an area covered by a restricted local access point or not may thus be provided in the access point or centrally in the network or perhaps as a combination of both.

The control unit according to the present invention can be implemented through one or more processors together with computer program code for performing its function. The program code mentioned above may also be provided as a computer program product, for instance in the form of a data carrier or as program code downloadable from a server.

There are several variations that are possible to make of the present invention. It is for instance possible that more than one mobile station may be registered for use with each restricted local access point. Link quality values have above been exemplified through the use of signal strength. It should also be realised that other link quality vales than signal strength may be used, like bit error rate or signal to interference ratio. As an alternative to providing each restricted local access point with a corresponding location area it is also possible to provide the restricted local access points in the same location area, but being repeated with a wide span between them in the network, e.g. every 10.000$^{th}$ ordinary base station. This ensures that two restricted local access points are not close to each other, i.e. it is unlikely that one user of a mobile station associated with one restricted local access point uses the restricted local access point intended for another user.

The invention also has a number of advantages. It allows an ordinary mobile station to be used both for a restricted local access point and in the main part of the network. Another advantage is that only the mobile stations registered to a restricted local access point may use it. This avoids that mobile stations nearby occupy the access point, while the calls of registered mobile stations are ensured to pass through the restricted local access point. It is furthermore easy to register mobile stations for use with a restricted local access point, since ordinary mobile station device configuration techniques may be used.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. Method of providing access for a limited registered set of mobile stations to a restricted local access point in a wireless network, comprising the steps of:
   attracting mobile stations in an area covered by the restricted local access point, for each mobile station that is attracted:
      determining, by the restricted local access point, whether the mobile station belongs to the limited registered set,
      based on the determination that the mobile station belongs to the limited registered set, allowing the mobile station access to the restricted local access point, and
      based on the determination that the mobile station does not belong to the limited registered set, rejecting access for the mobile station to the restricted local access point;
   wherein the step of attracting comprises sending by the restricted local access point a minimum link quality value level to all mobile stations in the covered area, where a link quality value that is determined for the restricted local access point by one of the mobile stations has to exceed the minimum link quality value level for the one mobile station to be attracted; and,
   wherein the step of attracting further comprises sending by the restricted local access point, to all mobile stations in the covered area, a network identity associated with the restricted local access point and other restricted local access points in the wireless network, wherein the network identity is different than a second identity of unrestricted global access points in the wireless network.

2. Method according to claim 1, wherein the step of attracting comprises sending an offset to all mobile stations in the covered area, where the offset is added to a link quality value determined for the restricted local access point by a mobile station when comparing link quality values of different access points in the network and the link quality value with added offset has to be higher than or equal to link quality values of other access points for the mobile station to be attracted.

3. Method according to claim 1, wherein the step of determining whether the mobile station belongs to the set comprises receiving an identifier of the mobile station, comparing the identifier with identifiers associated with mobile stations of the set and performing the steps of allowing or rejecting access in dependence of the result of the test.

4. Method according to claim 3, wherein the network is divided into different sectors, the local restricted access point is associated with another sector from that of neighbouring access points of the network, and the step of attracting comprises informing all mobile stations in the covered area of this sector and the step of rejecting comprises disallowing roaming into the sector.

5. Method according to claim 4, wherein there is more than one restricted local access point in the network, each being associated with a separate sector.

6. Method according to claim 5, wherein the mobile stations of the set may only access the sector of a corresponding restricted local access point.

7. Method according to claim 4, wherein there is more than one restricted local access point in the network, all being associated with the same sector.

8. Method according to claim 7, wherein all mobile stations of the set may access any restricted local access point of the sector.

9. Method according to claim 1, further comprising the step of receiving, at the restricted local access point, mobile station identifying information from the user of the access point and sending said information to a service device of the wireless network.

10. Method according to claim 1, further comprising steps of:
receiving input from a user at the restricted local access point;
in response to receiving the input, initiating a registration procedure at the restricted local access point;
detecting that a mobile station has been turned on in the covered area while the registration procedure is underway by receiving an International Mobile Subscriber Identity (IMSI) attach request from the mobile station; and,
in response to detecting that the mobile station has been turned on while the registration procedure is underway, registering the mobile station in the limited registered set.

11. Method according to claim 10, wherein receiving input from the user comprises detecting the user has pressed a button associated with the restricted local access point.

12. Method according to claim 11, further comprising detecting that the mobile station has been turned on while the registration procedure is underway by detecting that the mobile station has been turned on while the user is pressing the button.

13. Method according to claim 10, further comprising detecting that a mobile station has been turned on in the area while the registration procedure is underway comprises detecting that only one mobile station has been turned on in the area while the registration procedure is underway and further comprising:
detecting that more than one mobile station has been turned on in the area while the registration procedure is underway; and
in response to detecting that more than one mobile station has been turned on in the area while the registration procedure is underway, declining to register any of the mobile devices turned on while the registration is underway.

14. Method according to claim 13, wherein declining to register any of the mobile stations turned on while the registration is underway comprises sending an indication to the mobile stations to try registration again.

15. Control device for a restricted local access point for provision in a wireless network, said restricted local access point being implemented by a device comprising:
a radio communication unit, and,
said control device being arranged to:
order the radio communication unit to attract mobile stations in an area covered by the restricted local access point, and
for each mobile station that is attracted:
determine whether the mobile station belongs to a limited registered set of mobile stations,
based on the determination that the mobile station belongs to the limited registered set of mobile stations, allow the mobile station access to the restricted local access point, and
based on the determination that the mobile station does not belong to the limited registered set of mobile stations, reject access for the mobile station to the restricted local access point;
wherein the control device is further arranged to provide the radio communication unit with a minimum link quality value level to be sent all mobile stations in the covered area for attracting them, where a link quality value that is determined for the restricted local access point by one of the mobile stations has to exceed the minimum link quality value level for the one mobile station to be attracted; and,
wherein the control device further arranged to attract mobile stations by providing the radio communication unit with a network identity to be sent to all mobile stations in the covered area, wherein the network identity is associated with the restricted local access point and other restricted local access points in the wireless network, and wherein the network identity is different than a second identity of unrestricted global access points in the wireless network.

16. Control device according to claim 15, being further arranged to provide the radio communication unit with an offset to be to be sent all mobile stations in the covered area for attracting them, where the offset is added to a link quality value determined for the restricted local access point by a mobile station when comparing link quality values of different access points in the network and the link quality value with added offset has to be higher than or equal to link quality values of other access points for the mobile station to be attracted.

17. Control device according to claim 15, which when being arranged to determine whether the station belongs to the set is further arranged to receive an identifier of the mobile station, compare the identifier with identifiers associated with mobile stations of the set and allow or reject access in dependence of the result of the test.

18. Control device according to claim 17, wherein the network is divided into different sectors, the local restricted access point is associated with another sector than neighbouring access points of the network and the control device being further arranged to ordered the radio communication unit to inform all mobile stations in the covered area of this sector and when performing rejection is arranged to disallow roaming into the sector.

19. Control device according to claim 18, wherein there is more than one restricted local access point in the network, each being associated with a separate sector.

20. Control device according to claim 19, wherein the mobile stations of the set may only access the sector of the restricted local access point.

21. Control device according to claim 18, where there is more than one restricted local access point in the network, all being associated with the same sector.

22. Control device according to claim 21, wherein all mobile stations of the set may access any restricted local access point of the sector.

23. Control device according to claim 15 wherein at least a part of the control device is provided in association with a traffic control unit provided in the network.

24. Control device according to claim 15, wherein at least a part of the control device is provided as a control unit in the device implementing the restricted local access point.

25. Control device according to claim 15, wherein said control device being further arranged to:
receive an input from a user at the restricted local access point;
in response to receiving the input, initiate a registration procedure at the restricted local access point;

detect that a mobile station has been turned on in the covered area while the registration procedure is underway by receiving an International Mobile Subscriber Identity (IMSI) attach request from the mobile station; and, in response to detecting that the mobile station has been turned on while the registration procedure is underway, register the mobile station in the limited registered set.

26. Wireless network comprising:
a number of unrestricted global access points, and
at least one device implementing a restricted local access point that comprises:
  a radio communication unit, and
  a control device for the restricted local access point being arranged to:
    attract mobile stations in an area covered by the restricted local access point,
    for each mobile station that is attracted:
      determine whether the mobile station belongs to a limited registered set of mobile stations,
      based on the determination that the mobile station belongs to the limited registered set of mobile stations, allow the mobile station access to the restricted local access point, and
      based on the determination that the mobile station does not belong to the limited registered set of mobile stations, reject access for the mobile station to the restricted local access point;
  wherein the control device is further arranged to provide the radio communication unit with a minimum link quality value level to be sent all mobile stations in the covered area for attracting them, where a link quality value that is determined for the restricted local access point by one of the mobile stations has to exceed the minimum link quality value level for the one mobile station to be attracted; and,
  wherein the control device is further arranged to attract mobile stations by providing the radio communication unit with a network identity to be sent to all mobile stations in the covered area, wherein the network identity is associated with the restricted local access point and other restricted local access points in the wireless network, and wherein the network identity is different than a second identity of unrestricted global access points in the wireless network.

27. A restricted local access point in a wireless network for providing wireless service in a covered area to a limited registered set of mobile stations, the restricted local access point comprising:
  a radio communication unit, and
  a control device configured to:
    attract mobile stations by broadcasting to all mobile stations in the covered area at least the following: (1) a minimum link quality value level, where a link quality value that is determined for the restricted local access point by one of the mobile stations has to exceed the minimum link quality value level for the one mobile station to be attracted; and (2) a network identity associated with the restricted local access point and other restricted local access points within the wireless network, wherein the network identity is different than a second identity of unrestricted global access points in the wireless network;
    receive a location update from an attracted mobile station, wherein the location update comprises an identifier of the attracted mobile station;
    forward the location update received from attracted mobile station to a traffic control unit in the wireless network; and,
    receive a message from the traffic control unit, wherein the message indicates one of following: (1) the attracted mobile station is allowed to access the restricted local access point; or (2) the attracted mobile station is not allowed to access the restricted local access point.

28. The restricted local access point of claim 27, wherein the attracted mobile station has determined that a measure link quality value for the restricted local access point exceeds the minimum link quality value level.

* * * * *